United States Patent [19]

Chisvette et al.

[11] 4,427,810

[45] Jan. 24, 1984

[54] CONTINUOUS METHOD OF PRODUCING AQUEOUS PHTHALOCYANINE PIGMENT DISPERSIONS

[75] Inventors: Dominick Chisvette, Colonia; James Lattimore, Paterson; Donald M. Patterson, Milton, all of N.J.

[73] Assignee: Inmont Corporation, Clifton, N.J.

[21] Appl. No.: 408,956

[22] Filed: Aug. 17, 1982

Related U.S. Application Data

[63] Continuation of Ser. No. 259,890, May 4, 1981, abandoned, which is a continuation of Ser. No. 33,662, Apr. 26, 1979, abandoned.

[51] Int. Cl.$^3$ .................. C08K 5/34; C09D 11/00; C07D 207/00
[52] U.S. Cl. ........................... 524/88; 106/20; 106/22; 106/308 N; 106/308 Q; 260/245.72; 260/245.87
[58] Field of Search ............... 260/245.72, 245.87; 524/88; 106/20, 308 Q, 308 N

[56] References Cited

U.S. PATENT DOCUMENTS

| | | | |
|---|---|---|---|
| 2,556,726 | 6/1951 | Lane | 260/314.5 |
| 2,556,727 | 6/1951 | Lane et al. | 260/314.5 |
| 2,816,115 | 12/1957 | Howell | 260/314.5 |
| 2,857,400 | 10/1958 | Cooper | 260/314.5 |
| 2,908,690 | 10/1959 | Cooper | 260/314.5 |
| 2,999,862 | 9/1961 | Geiger | 106/22 |
| 3,593,927 | 7/1971 | Neill | 106/288 Q |
| 3,775,149 | 11/1973 | Langley et al. | 260/314.5 |
| 3,980,488 | 9/1976 | Barrington et al. | 260/314.5 |
| 4,257,951 | 3/1981 | Matrick | 260/245.87 |

*Primary Examiner*—Theodore Morris
*Attorney, Agent, or Firm*—Michael R. Chipaloski

[57] ABSTRACT

A continuous method for producing an aqueous dispersion of phthalocyanine blue pigment is disclosed. The method involves the following two steps:

(A) mixing in water a phthalocyanine crude pigment at about 10 to 50% by weight with from about 12 to 30% by weight of surfactant and (B) continuously pumping the blend of (A) through at least two shot mills in series in which the shot grinding media range in size from 0.1 to 1.5 mm. diameter and grinding the blend until the particle size of the crude is reduced to where the dispersion has suitable pigment tinctorial strength for use in inks and coatings.

The aqueous dispersion of blue pigment produced by this method is especially useful in inks and coatings.

14 Claims, No Drawings

CONTINUOUS METHOD OF PRODUCING AQUEOUS PHTHALOCYANINE PIGMENT DISPERSIONS

This application is a continuation of application Ser. No. 259,890, filed May 4, 1981, now abandoned, which in turn was a continuation of parent application Ser. No. 033,662, filed Apr. 26, 1979, now abandoned.

BACKGROUND OF THE INVENTION

1. Field of the Invention

This invention relates to a continuous process for the manufacture of phthalocyanine pigment dispersions of primarily beta crystal structure and more particularly to a continuous process for the manufacture of phthalocyanine blue pigment in an aqueous dispersion. The aqueous phthalocyanine blue pigment dispersion may be used directly in water-based printing inks and coatings and may be used directly in oil-based inks where the associated water can be tolerated. The dispersion may also be used in oil-based printing inks by flushing the aqueous pigment into a water-immiscible printing ink vehicle.

2. Description of the Prior Art

The manufacture of phthalocyanine crude pigments usually results in the formation of a product of relatively large crystal size or one containing impurities and has been referred to in the art as phthalo crude. This crude requires some form of particle size reduction and/or purification to be useful as a pigment having the tinctorial strength and intensity necessary for use in compositions such as inks, paints, etc.

Various methods have been proposed by the prior art to reduce the particle size and improve the purity of the phthalo crude.

One such method relates to the milling of the phthalo crude in an organic liquid as exemplified in U.S. Pat. Nos. 2,556,726; 2,556,727; 2,556,728; and 2,908,690.

The use of an aqueous medium for milling phthalo crude is also known and is disclosed in U.S. Pat. No. 2,999,862. This patent, however, relates to the use of water as the exclusive grinding assistant and results in a flocculated purified product. U.S. Pat. No. 3,775,149 relates to the preparation of phthalocyanine pigments and is specifically concerned with the milling of phthalo crude in aqueous suspension, in the presence of a surfactant, to give a filterable paste of phthalocyanine which is predominantly of the beta-pigment form. This method, however, also results in flocculated product where the pigment is purified when recovered as a presscake or in dry form. Thus, flocculation of the pigment has been a desirable feature according to these prior art processes and has provided a means for purifying the pigment. However, the resultant presscake or dry form of the pigment must then be redispersed for use in products such as inks, paints, etc. We have now found that beta-phthalocyanine pigment can be produced by a continuous method in aqueous suspension form that can then be used directly in water-based products such as inks and can be directly used in oil-based products where small amounts of water can be tolerated or flushed into oil-based products such as oil-based inks. This aqueous pigment dispersion according to the invention thus eliminates two steps in the use of phthalo blue pigment, i.e., filtering the flocculated pigment and redispersion for an end use.

SUMMARY OF THE INVENTION

The present invention relates to a two-step continuous method of converting crude phthalocyanine to a dispersed form which is useful in inks and coatings, said method comprising (A) premixing phthalo crude with from about 12 to about 30% by weight of surfactant, based on pigment, and an amount of water sufficient to reduce the crude concentration to 10 to 50% by weight, based on the total mixture, said premixing being accomplished by agitation to break loose crude agglomerates and obtain a uniform blend of the ingredients without appreciably reducing the particle size of the crude and (B) continuously pumping the blend of (A) through at least two shot mills in series containing between 50 and 90% by volume of a grinding media that has a size in the range of from about 0.1 to 1.5 mm. diameter and then grinding until the particle size has been reduced to where the pigment dispersion has suitable tinctorial strength for use in inks and coatings.

DETAILED DESCRIPTION OF THE INVENTION

The present invention provides a continuous method of producing aqueous phthalocyanine blue pigment dispersion. The method comprises (A) premixing phthalo crude with from about 12 to 30% by weight of surfactant based on pigment and an amount of water sufficient to reduce the crude concentration to 10 to 50% by weight, based on the total mixture, said premixing being accomplished by agitation to break down loose crude agglomerates and obtain a uniform blend of the crude without appreciably reducing the particle size of the crude, and (B) continuously pumping the blend of (A) through at least two shot mills in series containing between 50 and 90% by volume of a grinding media that has a size of from about 0.1 to 1.5 mm. diameter and then grinding until the particle size has been reduced to pigment particle size.

By phthalo crude we mean phthalocyanine crude pigments obtained commercially by various syntheses and include the copper-, cobalt-, zinc-, nickel-, and cadmium-phthalocyanines as well as metal-free phthalocyanine. Especially preferred is copper phthalocyanine because of its known commercial value in inks and coatings. The phthalo crude typically has a particle size wherein at least 80% of the crude particles have a size greater than 1 micrometer. After conversion of the crude according to the method of this invention, it has been found that at least 95% of the pigment particles have a size less than 1 micrometer, and this size is referred to herein as pigment particle size. The particle size measurements are conveniently made by using a Sedigraph 500 Particle Size Analyzer. By pigment particle size we mean that the particle size of the crude has been reduced to where the dispersion of phthalocyanine pigment has the tinctorial strength suitable for use in inks and coatings.

Tinctorial strength is conveniently measured by comparing the color of one pigment (the batch), mixed with a specified amount of white base, with the color of another pigment (the standard) mixed with an equal amount of the same white base. The amounts of standard and batch pigments are the same in the two tints, but they will appear to be different if there is a difference in strength. If the color of the batch tint appears to have been produced by a larger amount of pigment than the color of the standard tint, the batch is considered to the stronger than the standard. Utilizing such procedures, it has been found that the tinctorial strength of the crude is very small or essentially zero whereas that of the pigment dispersion according to this invention is much stronger (on the order of 100 times) than that of the crude.

In a preferred embodiment, the present invention relates to a method of converting a crude copper phthalocyanine pigment having at least 80% of the particle sizes of greater than 1 micrometer to a dispersed form which is useful in inks and coatings, said method comprising (A) premixing crude pigment, with 12 to 30%, by weight of surfactant and an amount of water sufficient to reduce the pigment concentration to 10 to 50%, by weight, based on total mixture, said premixing being accomplished by agitation to break down loose pigment agglomerates and obtain a uniform blend of the ingredients without appreciably reducing the particle size of the pigment, and (B) continuously pumping the blend of (A) through at least two shot mills in series containing between 50 and 90% by volume of a grinding media that has a particle size in the range of 0.1 to 1.5 mm. diameter, and then grinding until the dispersion has suitable tinctorial strength for use in inks and coatings.

The surfactants useful in the present method all must have an HLB value of greater than 8 and include water-soluble, non-ionic, cationic, and anionic types. However, only certain compounds in each class will be effective dispersants. In order to be effective a surfactant according to this invention must meet the following criteria:

(A) The concentration of the surfactant relative to the crude pigment must be such that the total surface of the crude is covered in a monomolecular layer of surfactant in the dispersed stage, and (B) The surfactant must be water-soluble or dispersible up to the required concentration level.

The non-ionic surfactants can generally be described as ethylene oxide adducts and can be represented by the following formulas:

I. $R-O(CH_2CH_2O)_n-H$ wherein $n=3$ to 10, R is selected from
(1) an alkyl group containing 10–22 carbon atoms, or
(2) an alkyl phenol group containing 8–18 carbon atoms.

II.

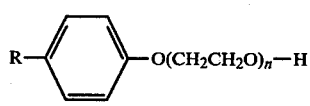

wherein $n=3$ to 10 and R is an alkyl group containing 8 to 18 carbon atoms.

III.

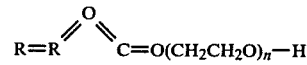

R is an alkyl group containing 12 to 22 carbon atoms.

Useful cationic surfactants are quaternary ammonium salts and specific amines and can be represented by the following formulas:

| | | Quaternary Cationics |
|---|---|---|
| I. | $\begin{array}{c} R_1 \quad X^- \\ | \\ R_4-N^+-R_2 \\ | \\ R_3 \end{array}$ | $R_2$, $R_3$ and $R_4$ are alkyl groups containing from 1 to 12 carbon atoms, $R_1$ is an alkyl group containing 8–22 carbon atoms, $X = Cl^-$, $Br^-$, $I^-$, & $HSO_4^=$ |
| | | Primary, Secondary or Tertiary Amines |
| II. | $\begin{array}{c} R^1 \quad X^- \\ | \\ N^+-R_2 \\ | \\ R_3 \end{array}$ | $R_1$ is a group containing at least 8 carbon atoms. $R_2$ and $R_3$ can be $H^+$ or alkyl groups containing from 1 to 22 carbon atoms. |
| | | Ethoxylated Primary Amines |
| III. | $R-N \begin{cases} (CH_2CH_2O)_nH \\ (CH_2CH_2O)_mH \end{cases}$ | n & m = 1 to 10 R consists of an alkyl group containing 8–22 carbon atoms. |
| | | Ethyoxylated Amides |
| IV. | $R-\overset{O}{\underset{}{C}}-N \begin{cases} (CH_2CH_2O)_nH \\ (CH_2CH_2O)_mH \end{cases}$ | R consists of a group containing from 7 to 21 carbon atoms. |
| | | Ethoxylated Fatty Secondary Amides |
| V. | $R-N \begin{cases} (CH_2CH_2O)_nH \\ CH_3 \end{cases}$ | R is a group containing 8 to 20 carbon atoms. |
| | | Substituted Quaternized Ethoxylated Amines |
| VI. | $\begin{array}{c} R_2 \quad X^- \\ | \\ R_1-N^+-(CH_2CH_2O)_nH \\ | \\ R_3 \end{array}$ | R is a group containing 8 to 20 carbon atoms. |
| | | Ethoxylated Fatty Secondary Amine |
| VII. | $R-\overset{O}{\underset{}{C}}-CH_3$ | R is a group containing 8 to 20 carbon atoms. |

The anionic surfactants can generally be described as acid salts and can be represented by the following formulas:

| | | Fatty Acid Salts |
|---|---|---|
| I. | $(R-COO^-)M^+$ | R is an alkyl group containing 12 to 22 carbon atoms. $M^+ = $ Na, K, NH$_4$ or substituted ammonium. |
| | | Sulfonates |
| II. | $(R-SO_3^-)M^+$ | R is an alkyl group containing 12 to 22 carbon atoms. $M^+ = $ Na, K, NH$_4$ or substituted |

| | -continued | |
|---|---|---|
| | | ammonium. |
| | | Sulfates |
| III. | R—OSO$_3^-$M$^+$ | R is an alkyl group containing 12 to 22 carbon atoms. M$^+$ = Na, K, NH$_4$ or substituted ammonium. |
| IV. | M$^+\bar{O}_3$S—CH—CooR<br>　　　　　｜<br>　　　　　CH$_2$<br>　　　　　｜<br>　　　　　CooR | Sulfosuccinates<br>M$^+$ = Na, K, NH$_4$ or substituted ammonium.<br>R is a group containing from 4 to 22 carbon atoms. |
| V. | R′—⟨⟩—SO$_3^-$M$^+$ | M$^{30}$ = Na, K, NH$_4$ or substituted ammonium.<br>R is an alkyl group containing 8 to 18 carbon atoms. |

Specific surfactants that have been found suitable include the following:

| Surfactant Type | Trade Name | Chemical Name |
|---|---|---|
| I. Non-Ionic | (a) Triton X-114 | Octyl phenoxy polyethoxyethanol |
| | (b) Triton N-101 | Nonyl phenoxy polyethoxyethanol |
| II. Anionic | (a) Aerosol OT-75 | Sodium dioctyl sulfosuccinate |
| | (b) Aerosol TR-70 | Sodium Bis (Tridecyl) sulfosuccinate |
| | (c) Ammonium Tallate | Ammonium Tallate |
| III. Cationic | (a) Ethomeen C-15 | Polyoxyethylene cocoamine |
| | (b) Ethomeen O-15 | Polyoxyethylene oleylamine |

Typical useful surfactant concentration levels have been found to be from about 12 to 30% by weight based on the crude phthalocyanine. This concentration level of surfactant is a critical aspect of the invention and has been found to result in a shorter grinding time (up to 15%) as well as the grinding of crude to a much smaller particle size without flocculation of the pigment in the aqueous solution. It is very important that flocculation not take place according to the present dispersion method of pigment production and the surfactant selection and concentration are therefore critical aspects of the present method.

The process according to the invention is preferably run at a temperature from about 5° to 80° C. and will work perfectly adequately at room temperature. In fact, however, all grinding operations result in generation of heat, so that cooling is necessary if the mix is to be kept at ambient temperature; the temperature may be allowed to rise somewhat, for example to 80° C., so as to save expense on cooling, without detrimental effect, but we prefer that the temperature of grinding should not in any case rise to above 90° C.

The blending of the crude (Step A) in the present method may be accomplished in any type reaction vessel or shot mill. The blend is agitated to produce a homogeneous composition. Preferably, the blend is then pumped through at least two pressurized shot mills in series capable of retaining grinding media made from glass, steel, ceramics, etc., in the size range of from 0.1 to 1.5 mm. diameter. The rate at which the blend is fed into the shot mills can be varied between 50 and 1000 lb/hour and most preferably in the range of 100 to 250 lb/hour. The blend is passed through at least two shot mills in series to achieve the tinctorial color value of pigment suitable for commercial use. However, it will be appreciated that the residence time in the shot mills will determine the particle size of the pigment but one, or more than two shot mills in series, can also be used in the grinding step. It has been found that the use of at least two shot mills provides the optimum conditions of time and power usage for the formation of pigment dispersion having the tinctorial color value desired in commercial use.

The aqueous pigment dispersions prepared in accordance with the present invention may be used for coloring a variety of compositions such as, for example, paper, plastics, fibers and especially water-based inks and paints. The aqueous pigment dispersions may also be used in oil-based inks and paints by flushing the aqueous dispersion into the desired oil-based product or by direct addition when the associated water can be tolerated.

Typically, inks prepared in accordance with this invention contain a pigment which is dispersed in a resin solution. The inks may contain other conventional ink ingredients. For instance, ethyl cellulose, wax compounds, pigment wetting agents, reactive hydrocarbon resins, etc., may be added for their known effects.

The invention will next be illustrated in terms of specific examples. In these examples, as well as in the other parts of the present application, all amounts and proportions are expressed as parts by weight unless otherwise indicated.

DESCRIPTION OF THE PREFERRED EMBODIMENTS

EXAMPLE I

Preparation of Phthalo Blue Aqueous Dispersion

The following materials were charged to a 150 gallon tank:
 (a) water—260 lbs.
 (b) Triton X-114—60 lbs.
 (c) Crude Cu-Phthalo Blue—300 lbs.

These materials were then blended in the tank until a homogeneous dispersion was obtained and a further charge of 130 lbs. of water added to reduce the viscosity of the mixture to one more suitable for shot milling. The mixture was continuously pumped through two shot mills (Drais mills) in series at a rate of 150 lbs/hr. Each Drais mill contained steel shot of 0.25 mm. diameter. Grinding was continued for 30 minutes after which the aqueous dispersion was found to possess superior blue color properties and the pigment concentration was 40% by weight. Grinding was completed at 150 lbs/hr and the resulting aqueous dispersion of phthalo blue pigment was used directly in an aqueous flexo ink formulation.

EXAMPLE II

The following surfactants are used in place of the Triton X-114 of Example I and the same procedure followed.
 (a) Triton N-101
 (b) Aerosol OT-75
 (c) Aerosol TR-70
 (d) Ethomeen C-15
 (e) Ethomeen 0-15
 (f) Ammonium Tallate Excellent aqueous blue pigment dispersions are formed using the Method of Example I with each of the six surfactants.

EXAMPLE III

Preparation of Blue Flush Base

The following were added to a 500 gallon Dough mixer:

| Component | Parts |
|---|---|
| 80% Acetic Acid Solution | 1.24 |
| Water | 11.80 |
| Pigment Dispersion (of Ex. I) | 26.95 |
| Reactive HC Resin | 10.70 |

Mixing took place for 35 minutes after which the water was decanted and a vacuum applied. To the above mixture the following mixture was then added:

| Component | Parts |
|---|---|
| Reactive HC Resin | 2.85 |
| Alkyd varnish | 3.85 |
| Antioxidant | .38 |
| Magie 500 oil | 1.54 |

Mixing again took place for 30 minutes after which the mixture was useful as a blue flush base for oil-based inks.

EXAMPLE IV

The following components were added to a Dough mixer:

| Component | Parts |
|---|---|
| HC resin varnish | 30.00 |
| alkyd resin | 25.00 |
| 520 Magie oil | 2.00 |
| emulsifier | 2.40 |

Mixing took place for 5 minutes until the mixture was uniform. The pigment dispersion of Example I was then added at 9.00 parts and mixing continued for 10 minutes after which 10.0 parts water and 10.0 parts 520 Magie oil were added and mixing continued for 10 minutes.

The resultant ink composition was found to be a superior oil-based ink.

We claim:

1. The method of converting a phthalocyanine crude wherein at least 80% of the crude particles have a size greater than 1 micrometer to a dispersed form which is useful in inks and coatings, said method comprising
(A) premixing phthalo crude with from about 12 to 30% by weight of surfactant based on pigment and an amount of water sufficient to reduce the crude concentration to 10 to 50% by weight, based on the total mixture, said premixing being accomplished by agitation to break down loose crude agglomerates and obtain a uniform blend of the crude without appreciably reducing the particle size of the crude, and
(B) continuously pumping the blend of (A) through at least two shot mills in series containing between 50 and 90% by volume of a grinding media that has a size of from about 0.1 to 1.5 mm. diameter thereby imparting sufficient grinding energy to reduce the particle size to below 0.5 micrometer and coat each particle with sufficient surfactant to provide a stable dispersion having suitable tinctorial strength for use in inks and coatings.

2. The method of claim 1 in which the grinding in the shot mill is carried out at a temperature of 5° to 80° C.

3. The method of claim 1 in which the surfactant is a water-soluble non-ionic surfactant.

4. The method of claim 3 in which the water-soluble non-ionic surfactant is an ethylene oxide adduct.

5. The method of claim 1 in which the surfactant is a water-soluble cationic surfactant.

6. The method of claim 5 in which the water-soluble cationic surfactant is a quaternary ammonium salt.

7. The method of claim 1 in which the surfactant is a water-soluble anionic surfactant.

8. The method of claim 7 in which the water-soluble anionic surfactant is an acid salt.

9. The method of claim 1 wherein the crude phthalocyanine pigment is selected from copper, cobalt, zinc, nickel, cadmium and metal-free phthalocyanine.

10. A water-based printing ink comprising dispersed phthalocyanine blue pigment in an aqueous solution of water-soluble resin wherein the pigment is dispersed by the method of claim 1.

11. A printing ink comprising phthalocyanine blue pigment dispersed in a water immiscible vehicle made by flushing the aqueous pigment dispersion of claim 1 into a water-immiscible printing ink vehicle.

12. The method of converting a crude copper phthalocyanine pigment wherein at least 80% of the crude has a size greater than 1 micrometer to a dispersed form which is useful in inks and coatings, said method comprising
(A) premixing crude pigment, with 12 to 30% by weight of surfactant and an amount of water sufficient to reduce the pigment concentration to 10 to 50%, by weight, based on total mixture, said premixing being accomplished by agitation to break down loose pigment agglomerates and obtain a uniform blend of the ingredients without appreciably reducing the particle size of the pigment, and
(B) continuously pumping the blend of (A) through at least two shot mills in series containing between 50 and 90% by volume of a grinding media that has a particle size in range of 0.1 to 1.5 mm. diameter thereby imparting sufficient grinding energy to reduce the particle size to below 0.5 micrometer and coat each particle with sufficient surfactant to provide a stable dispersion having suitable tinctorial strength for use in inks and coatings.

13. A water-based printing ink comprising copper phthalocyanine blue pigment dispersed in an aqueous solution of water-soluble resin wherein the pigment is dispersed by the method of claim 12.

14. A printing ink comprising copper phthalocyanine blue pigment dispersed in a water-immiscible vehicle made by flushing the aqueous pigment dispersion of claim 12 into a water-immiscible printing ink vehicle.

* * * * *